(12) United States Patent
Iwahara

(10) Patent No.: US 7,939,760 B2
(45) Date of Patent: May 10, 2011

(54) HARNESS PROTECTOR STRUCTURE FOR LINK

(75) Inventor: Seiji Iwahara, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 416 days.

(21) Appl. No.: 12/232,207

(22) Filed: Sep. 12, 2008

(65) Prior Publication Data
US 2009/0090539 A1    Apr. 9, 2009

(30) Foreign Application Priority Data
Oct. 5, 2007   (JP) .................... 2007-261660

(51) Int. Cl.
*H01B 7/00*   (2006.01)

(52) U.S. Cl. ............ 174/72 A; 174/135; 174/72 R; 174/88 R; 174/69; 248/49; 248/68.1; 248/70

(58) Field of Classification Search .......... 174/650, 174/68.1, 68.3, 135, 72 A, 74 R, 88 R, 70 C, 174/69, 97, 99 R, 72 R; 248/629, 60, 49, 248/68.1, 70, 74.2, 74.3, 73; 439/501, 502
See application file for complete search history.

(56) References Cited

U.S. PATENT DOCUMENTS

| | | | | |
|---|---|---|---|---|
| 5,556,059 A | * | 9/1996 | Maeda et al. | 174/72 A |
| 7,202,415 B2 | * | 4/2007 | Fujita | 174/72 A |
| 7,220,129 B1 | * | 5/2007 | Nishijima et al. | 174/72 A |
| 7,265,294 B2 | * | 9/2007 | Tsunoda et al. | 174/72 A |
| 7,265,295 B2 | * | 9/2007 | Kogure et al. | 174/72 A |
| 7,390,968 B2 | * | 6/2008 | Kogure et al. | 174/72 A |
| 7,683,259 B2 | * | 3/2010 | Tsubaki et al. | 174/72 A |

FOREIGN PATENT DOCUMENTS

| | | |
|---|---|---|
| JP | 03-015213 | 1/1991 |
| JP | 2001-260770 | 9/2001 |

OTHER PUBLICATIONS

European Search Report dated May 7, 2010, issued on the European Patent Application No. 08163388.5.

* cited by examiner

*Primary Examiner* — Angel R Estrada
(74) *Attorney, Agent, or Firm* — Edwards Angell Palmer & Dodge LLP

(57) ABSTRACT

A harness protector structure for a link is provided, by which the durability of a bent part of a wiring harness is improved and interference with the outside is prevented when the wiring harness is rotated and bent by using a link. The harness protector structure includes: a support part; a link rotatably connected to the support part; a protector provided on the link; and a bulging part having a wide opening opened at one end-side of a body part of the protector, wherein a wiring harness is arranged from the support part into the protector, wherein when the link is rotated, a following part of the wiring harness, which follows a bent part of the wiring harness, passes through the bulging part from the opening, and the wiring harness is guided to the outside from the body part while a slack of the wiring harness is absorbed.

3 Claims, 3 Drawing Sheets

HARNESS PROTECTOR STRUCTURE FOR LINK

BACKGROUND OF THE INVENTION (1) Field of the Invention

The present invention relates to a harness protector structure for a link, in which a wiring harness is bent and arranged along a harness protector provided on a rotatable link.

(2) Description of the Related Art

FIG. 2 illustrates an example of a conventional harness arranging structure to a link (see Japanese Patent Application Laid-Open No. 2001-260770).

In this conventional structure, a pair of links 41 and 42 is rotatably connected, a base end part of one link 41 is rotatably supported by a vehicle body 43 around a shaft part 44 while a base end part of another link 42 is freely supported by a slide door 45, a wiring harness 46 for supplying electricity is arranged along both links 41 and 42 from the vehicle body 43 to the slide door 45, and when the slide door 45 is opened or closed, the one link 41 can swing back and forth in a vehicle with respect to the shaft part 44 as a fulcrum while the other link 42 can swing with respect to an intermediate shaft part 47 as a fulcrum at an angle larger than that of the one link 41, so that the pair of the links 41 and 42 follows a movement of the slide door 45.

The wiring harness 46 is fastened to the link 41 and 42 with a taping 48. A connector 49 at an end of the wiring harness 46 is connector-connected to the wiring harness 46 situated on the side of the slide door 45. A part 50 of the wiring harness 46 guided out from an end of the other link 42 is expanded and contracted when the slide door 45 is opened and closed.

FIG. 3 illustrates an example of a conventional harness protector structure of a bending type (see Japanese Patent Application Laid-Open No. H3-15213).

In this conventional structure, a pair of rectangular tube-shaped protectors 51 and 52 made of synthetic resin is bendably connected to each other with an intermediate thin one-piece hinge 53 so as to construct a harness protector, a wiring harness 54 passes through both protectors 51 and 52, and the harness protector is bent at the hinge 53 when the harness protector is conveyed while the harness protector is stretched straight and arranged when the harness protector is mounted on a vehicle.

FIGS. 4A and 4B illustrate an example of a conventional harness protector structure for a link.

In this conventional structure, a rotary link 2 is rotatably connected to a support plate 1 situated on a fixed side at a shaft part, a wiring harness 8 passes through two rectangular tube-shaped protectors 3 and 55, the protectors 3 and 55 are fastened to the support plate 1 and the link 2, respectively, so that the wiring harness 8 is rotated integrally with the link 2.

However, in the structure shown in FIG. 2, the wiring harness 46 slackens at the intermediate shaft part 47, i.e. a connecting part 47 of both links 41 and 42, when the links 41 and 42 rotate, possibly causing an interference with the outside. In the structure shown in FIG. 3, a bent part 56 of the wiring harness 54 slackens and projects (shown with a reference numeral 56' in FIG. 3) at the hinge 53 when the protectors 51 and 52 are bent, resulting in that the slack at the bent part 56' is not removed when the protectors 51 and 52 are to be stretched straight, that is, the protectors 51 and 52 are hardly stretched straight.

In the structure shown in FIGS. 4A and 4B, as shown in FIG. 4B, when the link 2 is used being rotated largely as much as 180 degrees, the wiring harness 8 is bent with a small radius (shown with a reference numeral 20 in FIG. 4B) between the protector 3 situated on the side of the support plate 1 and the protector 55 situated on the side of the link 2, resulting in that bending durability of the wiring harness 8 is deteriorated or that a slack of the wiring harness 8 takes place between both protectors 3 and 55 and said slack 20 projects, possibly causing an interference with other components and so on and causing a damage or noise.

SUMMARY OF THE INVENTION

It is therefore an objective of the present invention to solve the above problems and to provide a harness protector structure for a link, by which the durability of the bent part of the wiring harness is improved and the interference with the outside is prevented when the wiring harness is rotated and bent when a link like the link as shown in FIG. 4 is used.

In order to attain the above objective, the present invention is to provide a harness protector structure for a link including:
a support part;
a link rotatably connected to the support part;
a protector provided on the link; and
a bulging part having a wide opening opened at one end-side of a body part of the protector,
wherein a wiring harness is arranged from the support part into the protector,
wherein when the link is rotated, a following part of the wiring harness, which follows a bent part of the wiring harness, passes through the bulging part from the opening, and the wiring harness is guided to the outside from the body part of the protector while a slack of the wiring harness is absorbed.

With the construction described above, when a slack takes place at the bent part of the wiring harness when the link is rotated, the slack is absorbed within the bulging part of the protector. Since the following part of the wiring harness, which follows the bent part of the wiring harness, enters into the bulging part, therefore a diameter of the bent part is enlarged and a bending stress applied to the bent part is reduced. Since the slack is absorbed within the bulging part of the protector, therefore the slack is prevented from projecting toward the outside and from interfering with the outside and therefore, damage of the bent part or noise due to the interference is prevented and the bending durability of the wiring harness is improved. Accordingly, the reliability of electrical conduction of the wiring harness is improved.

A size of the opening is set up so that a minimum allowable bending diameter of the bent part of the wiring harness is ensured.

With the construction described above, the diameter of the bent part of the wiring harness is controlled so that the bent part does not sustain an excessive stress and the bending durability of the wiring harness is improved.

When the link is rotated at an acute angle in one direction with respect to the support part, the wiring harness passes through the bulging part, while when the link is rotated at an obtuse angle in another direction with respect to the support part, the wiring harness passes through the body part of the protector.

With the construction described above, when the link is rotated so that an angle between the support part and the link becomes acute, the slack of the wiring harness is absorbed within the bulging part of the protector and the diameter of the bent part is enlarged.

DESCRIPTION OF THE PREFERRED EMBODIMENTS

Figure 1:
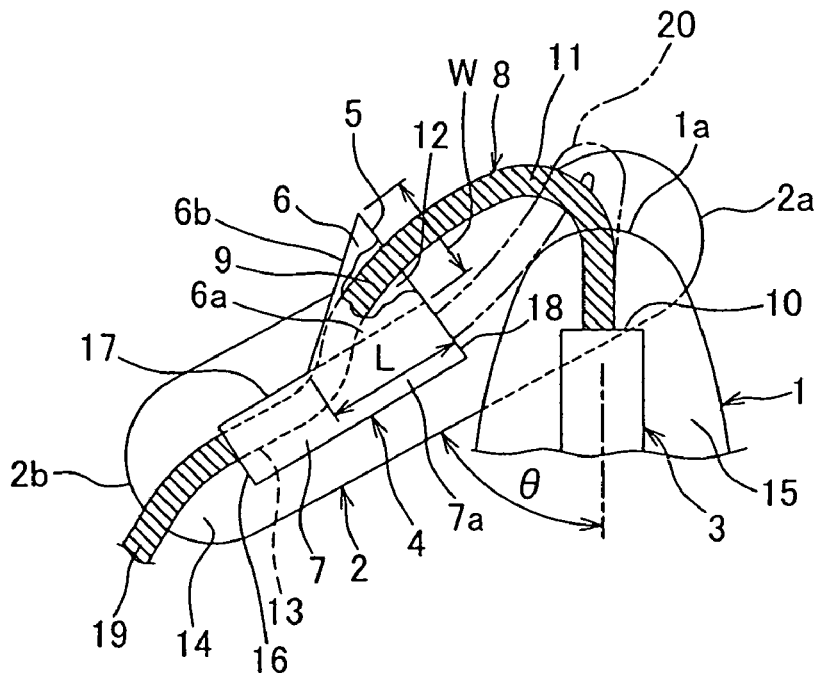
FIG. 1 is a front view illustrating a preferred embodiment of a harness protector structure for a link according to the present invention.
Figure 2:
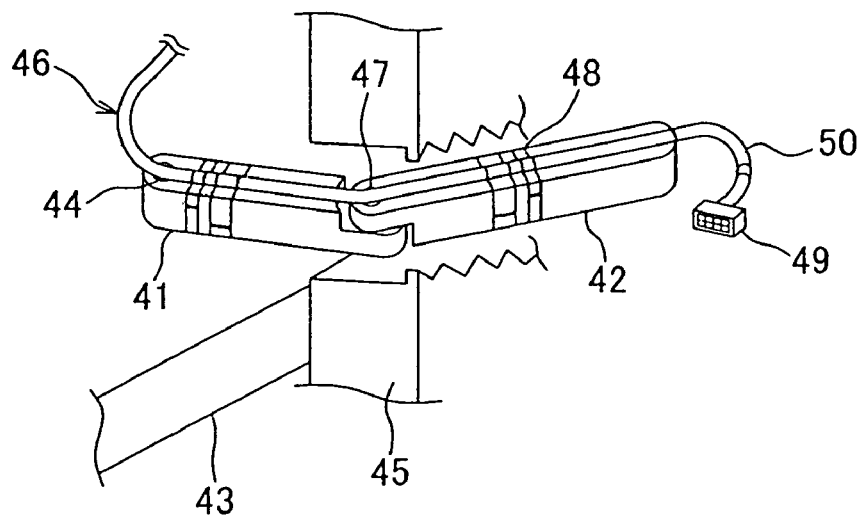
FIG. 2 is a perspective view illustrating an example of a conventional harness arranging structure to a link.
Figure 3:
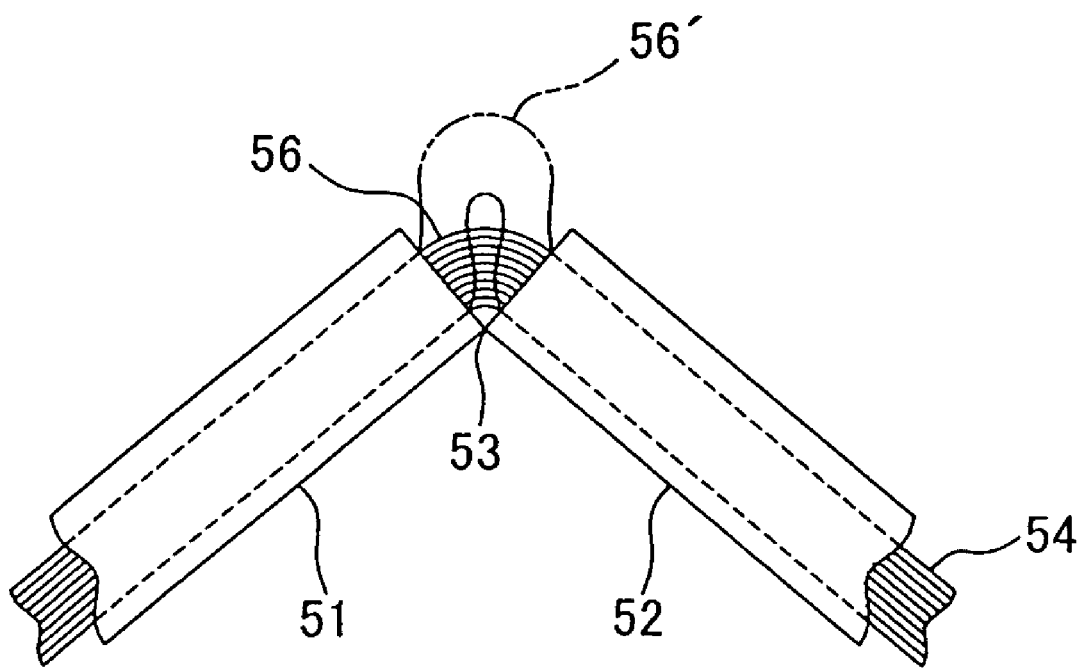
FIG. 3 is a front view illustrating an example of a conventional harness protector structure of a bending type.

In the following, the preferred embodiments of the present invention will be explained with reference to the attached drawing. FIG. 1 illustrates a preferred embodiment of a harness protector structure for a link according to the present invention.

In this harness protector structure, a link 2 is connected to a perpendicular support plate (i.e. the support part) 1 at a fixed side rotatably around a shaft part (not shown in FIG. 1), a normal rectangular tube-shaped protector 3 is perpendicularly fixed to the support plate 1, a protector 4 having a wide opening 5 situated at one end of the protector 4 is fixed to the link 2, a wiring harness 8 is allowed to be smoothly bendable with a large radius between the opening 5 of the protector 4 situated at the link-side and an upper opening 10 of the protector 3 situated at the support plate-side, and a slack 9 of the wiring harness 8 is received within the opening 5 of the protector 4 situated at the link-side, so that the slack of the wiring harness is absorbed. The support plate 1 may be called a fixed link or a fixed bracket and the link 2 may be called a movable link or a rotary link.

The protector 4 situated at the link-side includes a rectangular tube-shaped body part 7 and a hollow bulging part 6 projecting outward in a triangle shape in a front view in a direction, in which a diameter of a bent part 11 of the wiring harness 8 is widened, from one side of the body part 7 in the proximity of the shaft part of the link 2, wherein an inside space 12 of the bulging part 6 and an inside space 13 of the body part 7 communicate with each other throughout a whole length L of the bulging part 6, and the opening 5 of the bulging part 6 are widely opened toward the shaft part of the link 2. An opening size W of the opening 5 is set so that a bending radius for attaining the bending durability of the wiring harness 8 can be ensured.

The bulging part 6 includes: triangle-shaped wall parts 6a, 6a parallel with each other, situated at a front side and at a rear side thereof; and an inclined shaped or bent shaped wall part 6b which connects the wall parts 6a and 6a to each other, so that the bulging part 6 has a triangle pole-shaped inside space 12 surrounded by the three walls 6a, 6a and 6b, wherein each wall part 6a continues to and is flush with a corresponding perpendicular side wall 7a of the body part 7 and the inside space 12 communicates with a square pole-shaped inside space 13 in the body part 7. The side wall 7a situated at the rear side is fixed to a plate surface 14 situated on a front side of the link 2.

A rear-side wall part of the protector 3 is fixed to a front-side plate surface 15 of the support plate 1. An upper end (i.e. opening) 10 of the protector 3 is situated lower than an upper end 1a of the support plate 1. The wide opening (i.e. open end) 5 of the protector 4 of the link-side is situated nearer to a base end 2a or the shaft part of the link 2 than a distal end 2b of the link 2. A narrow rectangular shaped opening 16 of the protector 4 is situated nearer to the distal end 2b of the link 2 than the shaft part of the link 2. The opening 16 communicates straight with an opening 18 situated at the base end 2a-side. The opening 18 communicates integrally with and is flush with the opening 5 of the bulging part 6.

As shown in FIG. 1, the link 2 rotates leftward in an obliquely downward direction. On a condition that an angle θ between the support plate 1 and the link 2 is an acute angle, the bulging part 6 of the protector 4 is situated projecting in an obliquely upward direction, the opening 5 of the bulging part 6 faces to an upper end-side of the support plate 1, the wiring harness 8 is upward guided out from the protector 3 and smoothly bends leftward with a large radius, so that the wiring harness 8 is guided into the bulging part 6 from the wide opening 5 of the protector 4, guided into the body part 7 along an inner surface of the inclined shaped wall part 6b of the bulging part 6, and guided out to the outside from the opening 16 of the distal end 2b-side of the protector 4 along an inner surface of a side wall part 17 of the body part 7.

Since the bulging part 6 of the protector 4 upward projects from the wall part 17 of the body part 7, therefore a following part 9 of the wiring harness 8, which follows a bent part 11 of the wiring harness 8, is received in the bulging part 6 on a condition that a diameter of the following part 9 is enlarged. Thereby, a bent part 20 having a small radius or a slack 20 projecting upward, which has been seen as a typical shape of a bent wiring harness in a conventional example and is shown with a chain line in FIG. 1, is prevented from occurring. That is, the slack 9 of the wiring harness 8 is received into the bulging part 6 from the wide opening 5 while the wiring harness 8 smoothly bends with a large radius.

Figure 4A:
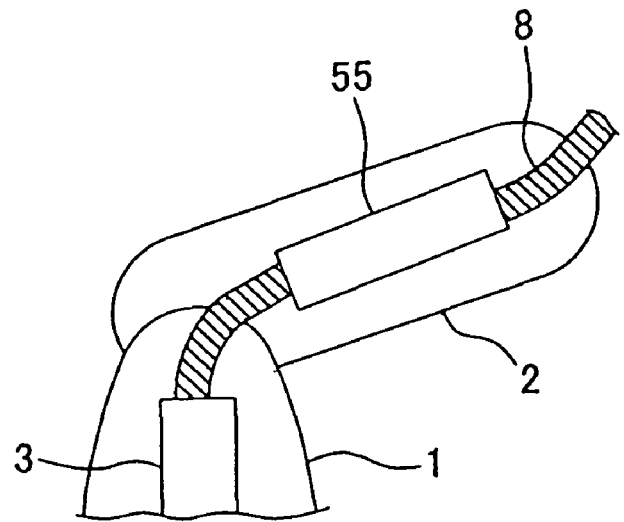
FIGS. 4A and 4B are front views illustrating an example of a conventional harness protector structure for a link at different rotation positions of the link.
Figure 4B:
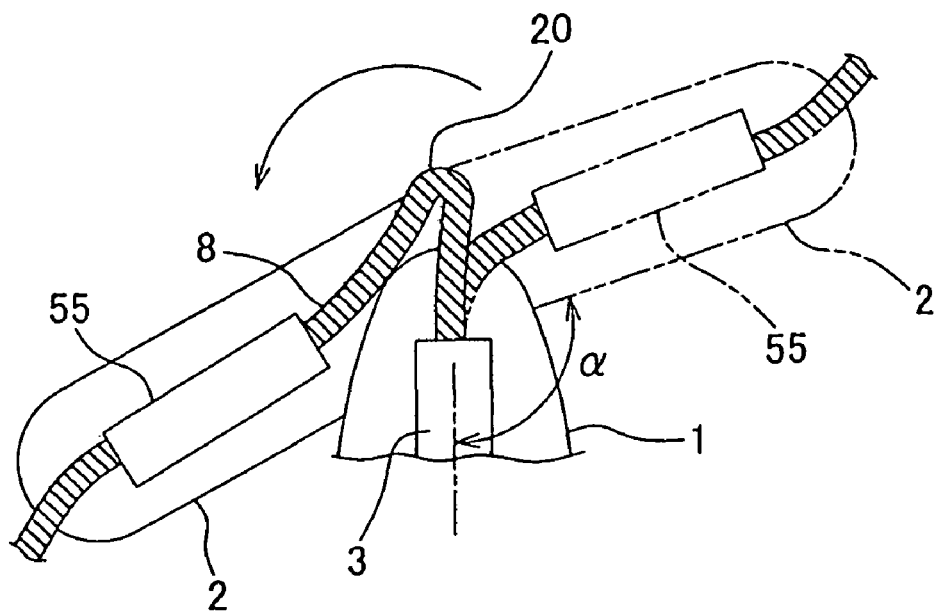

When the link 2 is rightward rotated clockwise by about 180 degree starting from a state illustrated in FIG. 1, similarly to a drawing shown with a chain line of the right side in FIG. 4B, an angle between the link 2 and the support plate 1 becomes an obtuse angle. At a rotation position shown with the chain line in FIG. 4B, the bulging part 6 of the protector 4 of the link-side in FIG. 1 projects downward.

Similarly to the drawing shown with the chain line in FIG. 4B, the wiring harness 8 is smoothly bent and arranged from the protector 3 of the support plate-side along an inner surface of the body part 7 of the protector 4 of the link-side. Alternatively, even on a condition that the link 2 is rightward rotated as the drawing shown with the chain line in FIG. 4B, when a slack of the wiring harness exists, the wiring harness 8 passes through the bulging part 6 with the slack being absorbed while the wiring harness 8 is guided out from the body part 7 in an obliquely upward direction.

For example, the support plate 1 shown in FIG. 1 is upward arranged in the rear of a vehicle body corresponding to a back door rotatable up and down of a motor vehicle, the wiring harness 8 is downward arranged and connected to the vehicle body (i.e. power supply-side) from the protector 3 of the support plate-side, the following part 9 of the wiring harness 8 guided out from the protector 3 of the link-side is arranged and fixed to the back door-side, and when the back door is fully closed, as the drawing shown with a solid line in FIG. 1, the link 2 is situated toward the rear of the vehicle in an obliquely downward direction, while when the back door is fully opened, as the drawing shown with the chain line in FIG. 4B, the link 2 is situated toward the front of the vehicle in an obliquely upward direction. The support plate 1 may be a part of the vehicle body.

An application of the support plate 1 and the link 2 is not limited to the back door. For example, they can be applied to opening and closing of a roof of a motor vehicle. They can also be applied to opening and closing of a slide door or a side door by arranging the support plate 1 not vertically but horizontally.

Generally, the wiring harness 8 includes a plurality of electric wires and a harness-protecting tube (such as a bellows-type corrugated tube or a net-shaped tube). A plurality of electric wires may be partially wound up with a tape or a band so as to construct a wiring harness.

When a corrugated tube, which includes dented grooves and projecting strips arranged alternately in a circumferential direction, is used, the dented grooves of the corrugated tube may be engaged with and fixed to ribs provided in the protector 3 of the support plate-side or in the body part 7 of the protector 4. Alternatively, the wiring harness 8 may be fixed to an end part (except the wide opening 5) of each protector 3, 4 by winding up with a tape.

The wiring harness 8 is in advance permitted to pass through the protectors 3 and 4, then on this condition the protectors 3 and 4 are fixed to the support plate 1 and the link 2, respectively, by means of clipping or bolting. Each protector 3, 4 may preferably be constructed in a division-type (capable of opening and closing) with a base part and a cover part for improving the workability of passing of the wiring harness 8.

When the support plate 1 and the link 2 are made of not metal but synthetic resin, the protectors 3 and 4 can be formed with resin integrally with each other. Each protector 3, 4 may be formed not in rectangular tub-shape but in cylindrical shape so that the bulging part 6 of the protector 4 of the link-side is allowed to rise up from a maximum diameter part of the cylindrical shaped body part 7 so as to be formed in an inverse U-shape. The wiring harness 8 may be fixed to the support plate 1 by means of tightening with a band without using the protector 3 of the support plate-side.

The construction illustrated in FIG. 1 is effective not only as a harness protector structure for a link but also as a wiring harness arranging structure, a wiring harness slack absorbing structure or an electric power supplying structure. The link 2 and the support plate 1 may be used as an electric power supplying apparatus together with the protectors 3 and 4.

The aforementioned preferred embodiments are described to aid in understanding the present invention and variations may be made by one skilled in the art without departing from the spirit and scope of the present invention.

What is claimed is:

1. A harness protector structure for a link comprising:
   a support part;
   a link rotatably connected to the support part;
   a protector provided on the link; and
   a bulging part having a wide opening opened at one end-side of a body part of the protector,
   wherein a wiring harness is arranged from the support part into the protector,
   wherein when the link is rotated, a following part of the wiring harness, which follows a bent part of the wiring harness, passes through the bulging part from the opening, and the wiring harness is guided to the outside from the body part of the protector while a slack of the wiring harness is absorbed.

2. The harness protector structure for a link according to claim 1, wherein a size of the opening is set up so that a minimum allowable bending diameter of the bent part of the wiring harness is ensured.

3. The harness protector structure for a link according to claim 1, wherein when the link is rotated at an acute angle in one direction with respect to the support part, the wiring harness passes through the bulging part, while when the link is rotated at an obtuse angle in another direction with respect to the support part, the wiring harness passes through the body part of the protector.

* * * * *